United States Patent [19]

Roux

[11] Patent Number: 4,744,096
[45] Date of Patent: May 10, 1988

[54] CLOCK RECOVERY CIRCUIT

[75] Inventor: Pierre Roux, Courbevoie, France

[73] Assignee: Alcatel Thomson Faisceaux Hertziens, Levallois Perret Cedex, France

[21] Appl. No.: 4,409

[22] Filed: Jan. 20, 1987

[30] Foreign Application Priority Data

Jan. 20, 1986 [FR] France ............................... 86 00700

[51] Int. Cl.[4] ............................................. H03D 3/24
[52] U.S. Cl. ..................................... 375/120; 375/86; 329/50
[58] Field of Search ....................... 375/81, 86, 82, 83, 375/97, 120; 329/12, 50, 100, 122

[56] References Cited

U.S. PATENT DOCUMENTS

| 4,054,838 | 10/1977 | Tretter ................................. 375/120 |
| 4,105,975 | 8/1978 | Sanders et al. ...................... 375/120 |
| 4,394,626 | 7/1983 | Kurihara et al. ..................... 331/12 |
| 4,419,759 | 12/1983 | Poklemba ............................. 375/81 |
| 4,458,356 | 7/1984 | Toy ..................................... 375/82 |
| 4,648,100 | 3/1987 | Mardirosian ......................... 375/86 |

OTHER PUBLICATIONS

IEEE Transactions on Communications; vol. COM-24, No. 5, May 1976, pp. 516-531, New York; K. H. Mueller et al; "Timing Recovery in Digital Synchronous Data Receivers".

Primary Examiner—Robert L. Griffin
Assistant Examiner—Stephen Chin
Attorney, Agent, or Firm—Sughrue, Mion, Zinn, Macpeak, and Seas

[57] ABSTRACT

A clock recovery circuit having two inputs (Vx, Vy) for receiving the in-phase and quadrature paths respectively from a demodulator, said clock recovery circuit comprising a first module (30) which includes a phase lock loop (15) and provides an output having a spectrum line at the clock frequency, said clock recovery circuit further comprising two second clock recovery modules (31, 32), each second clock recovery module having a first input (33, 34) connected to a respective one of the two demodulated paths (Vx, Vy) and a second input (35, 36) connected to the output from the first module (30), each of said second modules comprising, in succession from said first input, a sampled threshold device (37, 38, 39, 40) for providing the sign of the signal conveyed by the corresponding path and the sign of the error, and which may be made use of by circuits for performing signal regeneration per se, a phase estimator circuit (41, 42), a filter circuit (43, 44), and a voltage controlled phase shifter circuit (45, 46) controlled by the voltage output from the filter circuit and connected to shift the phase of the signal applied to the second input (35, 36) prior to its application to the threshold circuit.

7 Claims, 3 Drawing Sheets

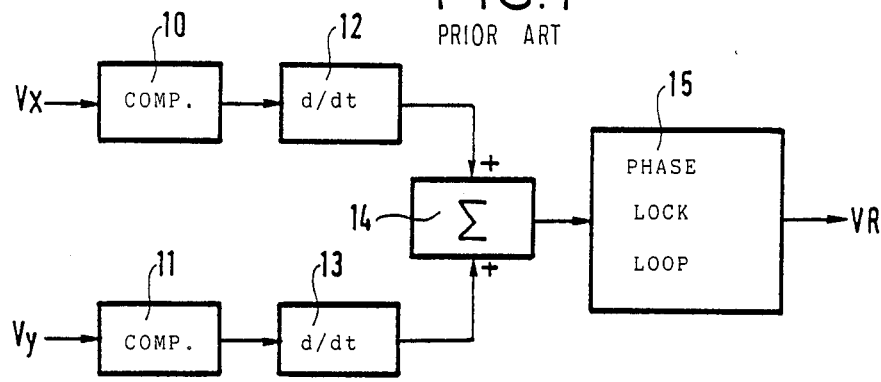
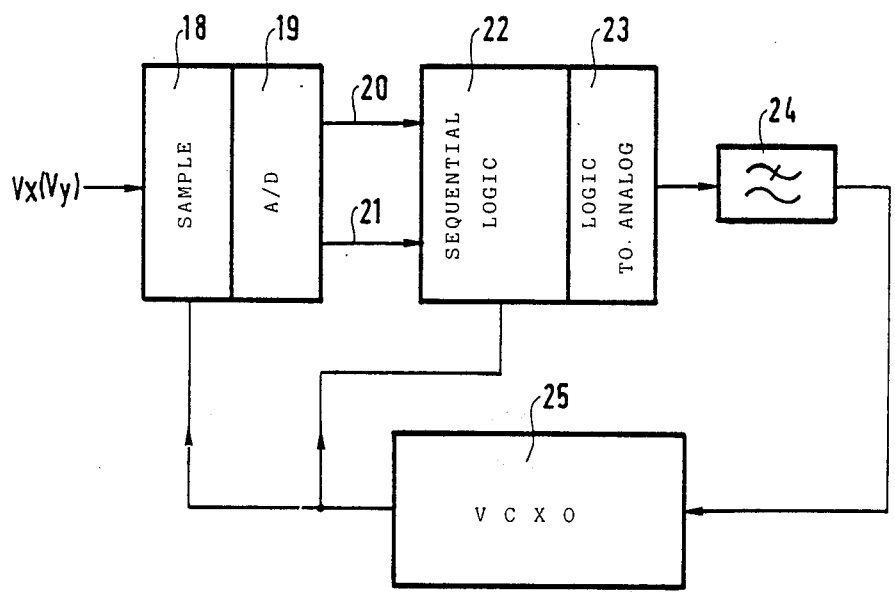

CLOCK RECOVERY CIRCUIT

The present invention relates to a clock recovery circuit.

BACKGROUND OF THE INVENTION

A clock recovery circuit is required for regenerating a digital signal after it has propagated through a distorting and noisy medium.

When a digital signal has been subjected to filtering or to various kinds of distortion, and has been degraded with noise, it can be processed in real time in order to regenerate it substantially perfectly. Over a long distance, digital transmission may require regeneration to take place many times.

Regeneration is made possible by the fact that even though the signal may be degraded by rounding and noise, use can be made of a priori information about the signal structure. This structure includes:

a clock rate at frequency fr, which determines charateristic instants at which discrete states should appear; and a predetermined number of such discrete states, e.g. two.

When performing regeneration, noise and distortion give rise to errors. Such errors are undetectable a priori unless a bit-by-bit comparison can be made with the initial signal.

In the simplest case of a purely binary signal, regeneration can be performed as follows:

being by making a decision concerning the level of the received signal, i.e. by interpreting whether it represents a binary 0 or a binary 1. This operation is very similar to clipping a signal that exceeds predetermined thresholds; and then recover the clock in order to perform sampling under the best possible conditions. Ideally, the recovered clock should have no interfering fluctuations relative to the initial clock. This implies that a spectrum line $fr=1/T$ can be used, whereas this particular spectrum line is normally absent from digital signals.

One might be tempted to create such a spectrum line by a local oscillator set to the nominal value of fr, however this technique is unusable because of the fundamental impossibility of obtaining two sinusoidal signals in two different locations having rigorously identical frequency and phase. This is because:

oscillators cannot be set to any frequency with sufficient accuracy; and frequency and phase are continually being disturbed by phenomena such as temperature and noise.

This explains why, when receiving a carrier modulated by a digital technique, it is necessary to have a circuit for recovering the clock which is used for regeneration purposes from the received signal itself.

The requirements for such a clock recovery circuit include the following points:

(a) immunity to distortion, and in particular to multipath propagation distortion;

(b) low residual jitter in the absence of distortion;

(c) satisfactory admissible jitter, i.e. a large amount of jitter should not lead to transmission errors; and (d) phase locking to obtain an eye diagram which is as open as possible.

The object of the present invention is to provide a clock recovery circuit which satisfies the above requirements in an advantageous manner.

SUMMARY OF THE INVENTION

The present invention provides a clock recovery circuit having two inputs for receiving the in-phase and quadrature paths respectively from a demodulator, said clock recovery circuit comprising a first module which includes a phase lock loop and provides an output having a spectrum line at the clock frequency, said clock recovery circuit further comprising two second clock recovery modules, each second clock recovery module having a first input connected to a respective one of the two demodulated paths and a second input connected to the output from the first module, each of said second modules comprising, in succession from said first input, a sampled threshold device for providing the sign of the signal conveyed by the corresponding path and the sign of the error, and which may be made use of by circuits for performing signal regeneration per se, a phase estimator circuit, a filter circuit, and a voltage controlled phase shifter circuit controlled by the voltage output from the filter circuit and connected to shift the phase of the signal applied to the second input prior to its application to the threshold circuit.

Said first module may include a non-linear processing circuit comprising a sign extractor circuit based on a comparator followed by a differentiator circuit based on a high-pass filter.

Advantageously, in the clock recovery circuit, each non-linear processing circuit comprises a sign extractor circuit based on a comparator and a differentiator circuit based on a high-pass filter, each sampled threshold circuit comprises a sampler followed by an analog-to-digital converter, each phase estimator circuit comprises a sequential logic circuit and a logic-to-analog interface, and each filter circuit is a low-pass filter.

In a variant embodiment of the invention, each filter circuit is a band-pass filter and two adjustable delay circuits are disposed respectively between the second input of each second module and the output from the first module.

BRIEF DESCRIPTION OF THE DRAWINGS

Embodiments of the invention are described by way of example with reference to the accompanying drawings, in which:

FIGS. 1 and 2 are block diagrams of two prior art clock recovery circuits;

MORE DETAILED DESCRIPTION

Figure 3:
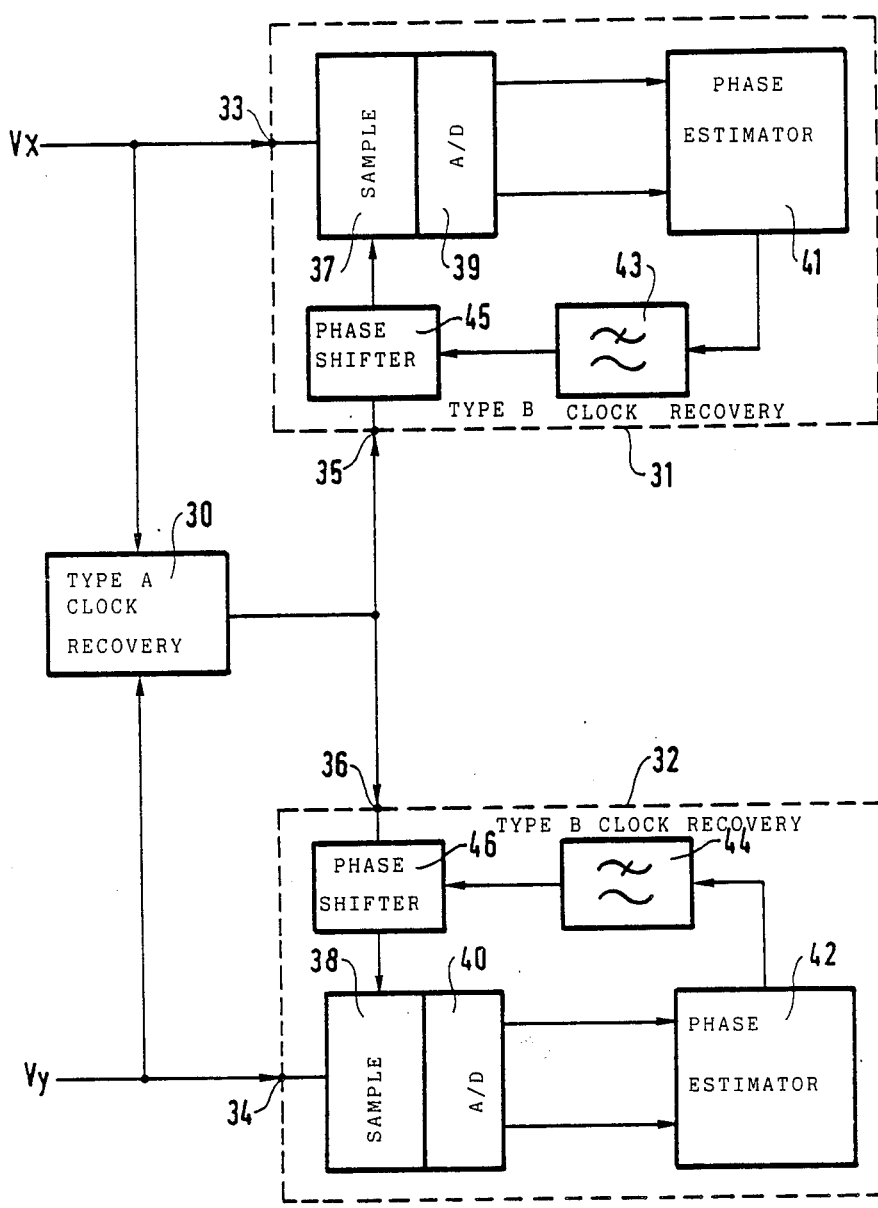
FIG. 3 is a block diagram of a circuit in accordance with the present invention.

A first type A of clock recovery circuit is shown in FIG. 1. It has two demodulated input paths Vx and Vy which are respectively in phase and in quadrature. The input paths are connected to respective comparators 10 and 11 followed by respective differentiators 12 and 13, with the outputs from the differentiators being applied to two inputs of a summing circuit 14 which is coupled to a phase lock loop 15.

This non-linear processing of the two demodulated paths Vx and Vy generates a signal which includes a spectrum line at the clock frequency. This spectrum line VR is then extracted by a phase lock loop 15. This circuit recovers the clock on the basis of "zero passes" in the received signal: the signal from which the clock spectrum line is extracted is contituted by pulses which detect the zero passes of one or other of the input signal paths.

A second type B of clock recovery cirucit is shown in FIG. 2 and includes a sampled threshold circuit on one of the demodulated paths Vx or Vy. The sampled threshold circuit may be constituted, for example, by a sampler 18 followed by an analog-to-digital converter 19 having a certain number of possible states, e.g. 12, thereby providing an output 20 representative of the sign of the signal conveyed by the path Vx (or Vy) and an output 21 having a signal representative of the sign of the estimated error. This circuit can also be used to regenerate the transmitted signal. The two sign signals 20 and 21 are applied to a phase estimator circuit constituted by a sequential logic circuit 22 and a logic-to-analog interface 23.

The output signal from the phase estimator circuit 22, 23 is applied to a low-pass filter 24 followed by a voltage controlled crystal oscillator (VCXO) 25 the output of which constitutes the recovered clock and is looped back both to the sampler 18 and to the sequential logic circuit 22.

Such a circuit is thus a phase lock loop in which the phase error is estimated on the basis of a real-time study of the received signal. Such phase estimators are described in an article in the May 1976 number of IEEE by Kurt H. Meuller and Markus Muller.

The sampled analog-to-digital converter 19 provides the estimated sign of the signal on the path under consideration together with the estimated sign of the error (where the estimated error = the received level − the estimated level). This data is stored for a certain number of symbol times and is processed in such a manner as to obtain digital signals in which the statistical distribution of logic levels is charateristic of the phase error. An estimate of the phase error is extracted therefrom.

One example of such a circuit provides an output signal $e^\phi$ from the estimator 22, 23, where:

$$e^\phi = \text{sign } X \cdot \text{sign (error on } X_{-1}) - \text{sign } X_{-1} \cdot \text{sign (error on } X)$$

where $X_{-1}$ and $X$ are values taken at a separation of one symbol time. It can be shown, that on average:

$$e^\phi = 0 = h_1 - h_{-1}$$

where $h_1$ and $h_{-1}$ are sample No. 1 and sample No. −1 of the impulse response of the channel under consideration.

The clock locks onto a phase for which the error is zero:

$$e^\phi = 0 = h_1 = h_{-1}.$$

These two types of clock recovery circuit shown in FIGS. 1 and 2 perform differently relative to the operational requirements mentioned above. Thus, when examining each of the four points a, b, c, and d mentioned above:

(a) The first type (A) of clock recovery circuit is more tolerant of distortion, as can be seen from the synchronization capture and loss signatures, which signatures are representative of the circuit's ability to withstand multi-path propagation. This is explained by the fact that the second type (B) of clock recovery circuit makes use of the estimated error and distortion affects the validity of error estimation.

This point is important, since the convergence of self-adapting systems which enables them to compensate the effects of multi-path propagation requires the clock to be present.

(b) The second case (B) provides better residual jitter.

(c) Both cases can give satisfactory admissible jitter by suitably adjusting the bandwidth of the loop.

(d) The second case (b) provides better phase locking with respect to obtaining an open eye diagram. In this case there is no need for manual adjustment of phase shift.

The circuit of the present invenitn seeks to combine the advantages of both of the types of circuit (A and B) described above.

A circuit in accordance with the invention comprises a first clock recovery module 30, e.g. of the type shown in FIG. 1, together with two second modules 31 and 32.

The first module 30 may be based on various other kinds of prior art clock recovery circuit, for example on a clock recovery circuit based on applying a non-linear operation to the modulated high frequency signal.

Each of the second modules 31 (32) has a first input 33 (34) connected to one of the two demodulated paths Vx (Vy) and a second input 35 (36) connected to the output from the first module 30.

Each of the second modules 31 (32) comprises, in succession from its first input 33 (34): a sampled threshold circuit constituted, for example, by a sampler 37 (38) followed by an analog-to-digital converter 39 (40); a phase estimator circuit 41 (42) of the type described above with reference to FIG. 2; a filter circuit, e.g. a low-pass filter 43 (44); and a voltage controlled phase shifter 45 (46) connected firstly to the sampler 37 (38) and secondly to the second input 35 (36) which is connected to the output from the first module 30.

The clock is recovered in two stages, with the type A module 30 recovering an intermediate clock. Each of the type B phase estimators 41 (42) adjusts the clock phase applied to the decision-taking circuit (i.e. the sampled analog-to-digital converter). Thus, the outputs of the phase shifters 45 and 46 may be considered the outputs of the recovery circuits 31 and 32, respectively. This adjustment is performed separately for each of the two paths Vx and Vy.

The four points a, b, c, and d mentioned above are now considered in turn:

(a) The phase control provided by the type B modules 31 (32) may be inhibited by setting their phase shifters to fixed values. Such inhibition can be performed by analog switches in the event, for example, of multi-path propagation. The carrier recovery alarm signal can be used for controlling such inhibition. The system then becomes a type A clock recovery circuit.

(b), (c) By adjusting the bandwidth of its feedback loop to be sufficiently wide, the type A module 30 ensures that jitter performance satisfies the usual specifications for admissible jitter.

The bandwidths of the two type B phase lock loops should be adjusted to wider values than the type A bandwidth. This ensures that the residual jitter from the type A loop is corrected, and the only remaining residual jitter is from the type B phase lock loops, which have little residual jitter.

(d) The circuit is naturally locked onto an eye diagram which is as open as possible with $h_1 = h_{-1}$.

Figure 4:
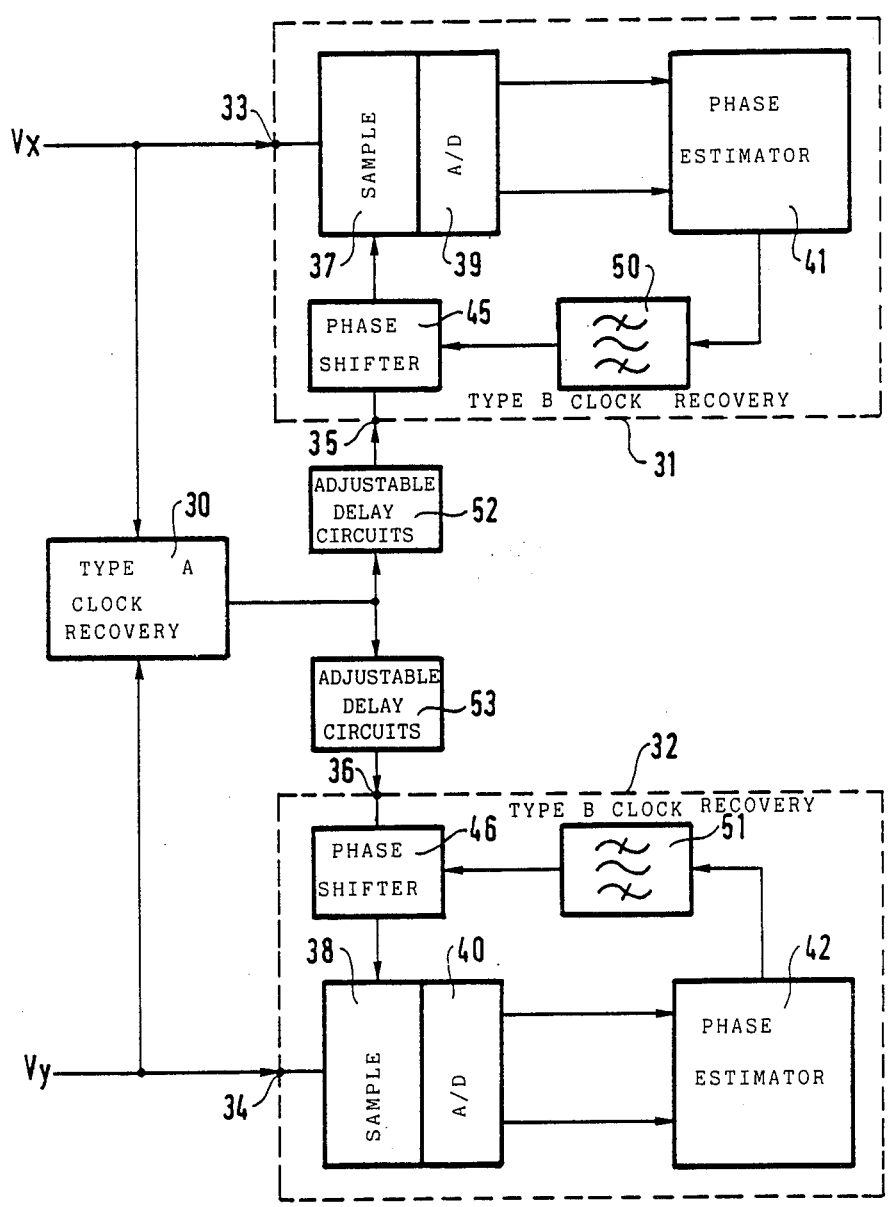
FIG. 4 is a block diagram of a variant circuit in accordance with the present invention.

In a variant embodiment of the invention, as shown in FIG. 4, most of the items are the same as shown in FIG. 3. However, the low-pass filters 43 (44) are replaced by band-pass filters 50 (51) and manually adjustable delay circuits 52 (53) are inserted between the output from the first module 30 and the second inputs 35 (36) to each second module 31 (32).

Such a circuit is compatible with a self-adaptive equalizer.

The type B clock recovery described above uses the error function: $e^\phi = h_1 - h_{-1}$.

However, if the equalizer has m leading coefficients and n trailing coefficients, then samles of the impulse response in the range $-m$ to $+n$ are cancelled, other than the central sample (where m is less than n, for example).

The above error function then becomes unusable. However, compatibility is made possible by applying two measures:

(1) Choosing self-adaptive operation including a "dead zone". In this kind of operation no modification is made to the transfer function of the equalizer so long as the eye diagram remains sufficiently open. The "sufficiently open" threshold is selected in such a manner as to ensure that the system remains well away from decision errors.

Under such conditions, a small phase error in the clock gives rise to no reaction in the self-adaptive equalizer and clock phase locking can take place.

So far, compatibility is still not complete, since after a convergence stage in the self-adaptive algorithm (on the appearance of a distortion, for example), the clock takes up a random phase value.

A second measure must also be taken:

(2) The structure shown in FIG. 2 serves to eliminate the DC component from phase locking: this is done by replacing the low-pass loop filters 43 (44) with band-pass filters 50 (51) having a very low bottom cut-off frequency (a few tens of hertz).

The jitter transfer function of the phase locking becomes zero at DC. The average clock phase is now fixed by manual adjustment using the adjustable delay devices 52 and 53 which enable the clock phase position to be adjusted so that the eye diagram is optimally open. Fortunately, this phase is less critical in self-adaptive systems and the adjustment easier to perform. Phase locking retains its dynamic function.

The reduction of residual jitter (on the clock rate used for making decisions) remains effective.

Naturally, the above description relates merely to preferred embodiments of the present invention and component parts may be replaced by equivalent parts without going beyond the scope of the claims.

I claim:

1. A clock recovery circuit having two inputs for receiving the in-phase and quadrature paths respectively from a demodulator, said clock recovery circuit comprising a first module which includes a phase lock loop and provides an output having a spectrum line at the clock frequency, said clock recovery circuit further comprising two second clock recovery modules, each second clock recovery module having a first input connected to a respective one of the two demodulated paths and a second input connected to the output from the first module, each of said second modules comprising, in succession from said first input, a sampled threshold device for providing the sign of the signal conveyed by the corresponding path and the sign of the error, a phase estimator circuit connected to the output of the sampled threshold device for providing an estimate of the phase error between the input signal and the recovered clock, a filter circuit connected to the output of the phase estimator for providing a filtered control signal, and a voltage controlled phase shifter circuit controlled by said filtered control signal and connected to shift the phase of the signal applied to the second input prior to its application to the threshold device.

2. A clock recovery circuit according to claim 1, wherein said first module includes a non-linear processing circuit comprising a sign extractor circuit based on a comparator followed by a differentiator circuit based on a high-pass filter.

3. A clock recovery circuit according to claim 1, wherein each sampled threshold circuit comprises a sampler followed by an analog-to-digital converter.

4. A clock recovery circuit according to claim 1, wherein each phase estimator circuit comprises a sequential logic circuit and a logic-to-analog interface.

5. A clock recovery circuit according to claim 1, wherein each filter circuit is constituted by a low-pass filter.

6. A clock recovery circuit according to claim 1, wherein each filter circuit is constituted by a band-pass filter.

7. A clock recovery circuit according to claim 5, wherein two adjustable delay circuits are disposed respectively between the second input to each second module and the output from the first module.

* * * * *